United States Patent
Chiang (10) Patent No.: US 10,474,364 B2
(45) Date of Patent: Nov. 12, 2019

(54) MEMORY CONTROL DEVICE AND METHOD

(71) Applicant: Silicon Motion, Inc., Jhubei, Hsinchu County (TW)

(72) Inventor: Yao-Pang Chiang, New Taipei (TW)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 0 days.

(21) Appl. No.: 16/016,134

(22) Filed: Jun. 22, 2018

(65) Prior Publication Data

US 2019/0065071 A1    Feb. 28, 2019

(30) Foreign Application Priority Data

Aug. 31, 2017    (TW) ............................. 106129770 A (51) Int. Cl.
| | |
|---|---|
| *G06F 3/06* | (2006.01) |
| *G06F 12/08* | (2016.01) |
| *G06F 12/0811* | (2016.01) |
| *G06F 12/02* | (2006.01) |

(52) U.S. Cl.
CPC .......... *G06F 3/0608* (2013.01); *G06F 3/0656* (2013.01); *G06F 3/0658* (2013.01); *G06F 3/0659* (2013.01); *G06F 3/0673* (2013.01); *G06F 12/0246* (2013.01); *G06F 12/0811* (2013.01); *G06F 2212/1044* (2013.01); *G06F 2212/2022* (2013.01); *G06F 2212/283* (2013.01)

(58) Field of Classification Search
None
See application file for complete search history.

(56) References Cited

U.S. PATENT DOCUMENTS

| | | | |
|---|---|---|---|
| 7,320,013 B2 | 1/2008 | Mukund et al. | |
| 8,370,562 B2 * | 2/2013 | Lasser ................. | G06F 12/0246 365/185.03 |
| 2004/0255076 A1 * | 12/2004 | Oyaizu ............... | G06F 13/1673 711/103 |

(Continued)

FOREIGN PATENT DOCUMENTS

| | | |
|---|---|---|
| CN | 101174245 B | 6/2010 |
| CN | 103984643 B | 4/2016 |

(Continued)

*Primary Examiner* — Kaushikkumar M Patel
(74) *Attorney, Agent, or Firm* — McClure, Qualey & Rodack, LLP (57) ABSTRACT

A memory control device and method are provided in the invention. The controller of the memory control device includes a static random access memory (SRAM) which has a first buffer. The controller receives a command from a host device, determines the operation type indicated by the command, and obtains data parameters corresponding to data stored in the SRAM. The DRAM is coupled to the controller and has a second buffer. The controller determines whether the first buffer is enough to store data corresponding to the command according to the data parameters. When the first buffer is not enough to store data corresponding to the command, the controller backs up data corresponding to another operation type to the second buffer, and the controller temporarily stores the data corresponding to the command, and updates the data parameters.

14 Claims, 5 Drawing Sheets

(56) References Cited

U.S. PATENT DOCUMENTS

| | | | | |
|---|---|---|---|---|
| 2008/0147968 A1* | 6/2008 | Lee | .................... | G06F 11/1068 |
| | | | | 711/103 |
| 2009/0172286 A1* | 7/2009 | Lasser | ................ | G06F 12/0804 |
| | | | | 711/127 |
| 2010/0174853 A1* | 7/2010 | Lee | .................... | G06F 12/0246 |
| | | | | 711/103 |
| 2013/0086301 A1* | 4/2013 | Cleveland | ............. | G06F 3/0689 |
| | | | | 711/103 |
| 2013/0111116 A1* | 5/2013 | Inada | ..................... | G06F 12/02 |
| | | | | 711/103 |
| 2014/0149646 A1* | 5/2014 | Im | ...................... | G06F 12/0246 |
| | | | | 711/103 |
| 2016/0328328 A1* | 11/2016 | Lee | .................... | G06F 12/0868 |
| 2017/0052859 A1* | 2/2017 | Scouller | ............. | G06F 12/0246 |
| 2018/0173462 A1* | 6/2018 | Choi | .................... | G06F 3/0659 |

FOREIGN PATENT DOCUMENTS

| | | |
|---|---|---|
| CN | 106681695 A | 5/2017 |
| TW | 201729105 A | 8/2017 |

\* cited by examiner

MEMORY CONTROL DEVICE AND METHOD

CROSS REFERENCE TO RELATED APPLICATIONS

This Application claims priority of TW Patent Application No. 106129770 filed on Aug. 31, 2017, the entirety of which is incorporated by reference herein.

BACKGROUND OF THE INVENTION

Field of the Invention

The invention generally relates to technology for controlling memory, and more particularly, to memory control technology used in determining whether to move data from a static random access memory (SRAM) to a dynamic random access memory (DRAM) based on the amount of storage space in the static random access memory.

Description of the Related Art

Semiconductor memory is an integrated circuit (IC) which is made from silicon wafers. There are two types of semiconductor memories: volatile memory devices and non-volatile memory devices. A volatile memory device is a memory device which will lose data when the power is interrupted. Static random access memory (SRAM), dynamic random access memory (DRAM), and synchronous DRAM (SDRAM) are some examples of volatile memory. A nonvolatile memory device is a memory device which will preserve data even if power is interrupted. Read-only memory (ROM), programmable ROM (PROM), erasable PROM (EPROM), electrically-EPROM (EEPROM), flash memory, parameter RAM (PRAM), magnetoresistive RAM (MRAM), resistive RAM (RRAM), and ferroelectric RAM (FRAM) are some examples of nonvolatile memory.

In conventional memory-control technologies, DRAM may be used to cache data that the host device wants to read from or write into a flash memory device. However, because of limited bandwidth of DRAM, the efficiency of reading or writing data will be low.

Therefore, in some memory-control technologies, the SRAM in the controller may be used to cache (or temporarily store) data that the host device wants to read from or write into the flash memory device to increase the efficiency of reading or writing data. However, because the operations of reading and writing data share the same SRAM, when the read operation and write operation are performed alternately, the command latency of the host device will occur. For example, when a read operation is performed after a write operation, the controller needs to back up the data which has been temporarily stored in the SRAM to the DRAM first, and then the controller may clear space in the SRAM to make sure that the host device is able to use the SRAM to cache the data for the read operation. The controller may not re-back up data which is already backed up in the DRAM to the SRAM until the read operation has been completed. The operations of backing up data to the DRAM and re-backing up data to the SRAM may lead to great command latency.

BRIEF SUMMARY OF THE INVENTION

A memory control device and method for determining whether to move the data from a static random access memory (SRAM) to a dynamic random access memory (DRAM) based on the amount of storage space in the static random access memory are provided to overcome the problems mentioned above.

An embodiment of the invention provides a memory control device. The memory control device comprises a controller, a static random access memory and a dynamic random access memory. The controller comprises the static random access memory, and the static random access memory has a first buffer. In addition, the controller receives a command from a host device, determines the operation type that is indicated by the command from the host device, and obtains data parameters corresponding to data stored in the static random access memory. The dynamic random access memory is coupled to the controller and has a second buffer. The controller determines whether the first buffer is enough to store data corresponding to the command from the host device according to the data parameters. When the first buffer is not enough to store data corresponding to the command from the host device, the controller backs up data which corresponds to another operation type in the first buffer to the second buffer, wherein the another operation type is different from the operation type corresponding to the command from the host device, and the controller temporarily stores the data corresponding to the command from the host device in the first buffer, and updates the data parameters.

In some embodiments, the controller further records an initial index, an end index and quantity of data corresponding to different operation types.

In some embodiments, the operation type is a write operation or a read operation.

In some embodiments, when according to the command from the host device, the controller knows that the read operation will be performed after the write operation has been completed, the controller determines whether the first buffer has enough space to temporarily store the reading data corresponding to the read operation according to the initial index and the end index of the writing data corresponding to the write operation. When a storage range for the reading data covers storage space which is used to store the writing data, the controller backs up the writing data in the second buffer.

In some embodiments, when according to the command from the host device, the controller knows that the write operation will be performed after the read operation has been completed, the controller determines whether the first buffer has enough space to temporarily store the writing data corresponding to the write operation according to the initial index and the end index of the reading data corresponding to the read operation. When a storage range for the writing data covers storage space which is used to store the reading data, the controller backs up the reading data in the second buffer.

An embodiment of the invention provides a memory controlling method. The memory controlling method comprises the steps of receiving a command from a host device; determining an operation type indicated by the command from the host device; obtaining data parameters; determining whether a first buffer is enough to store data corresponding to the command from the host device according to the data parameters; when the first buffer is not enough to store data corresponding to the command from the host device, backing up data which corresponds to another operation type in the first buffer to a second buffer, wherein the another operation type is different from the operation type corresponding to the command from the host device; temporarily storing the data corresponding to the command from the host device in the first buffer; and updating the data parameters.

Other aspects and features of the invention will become apparent to those with ordinary skill in the art upon review of the following descriptions of specific embodiments of methods and devices.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
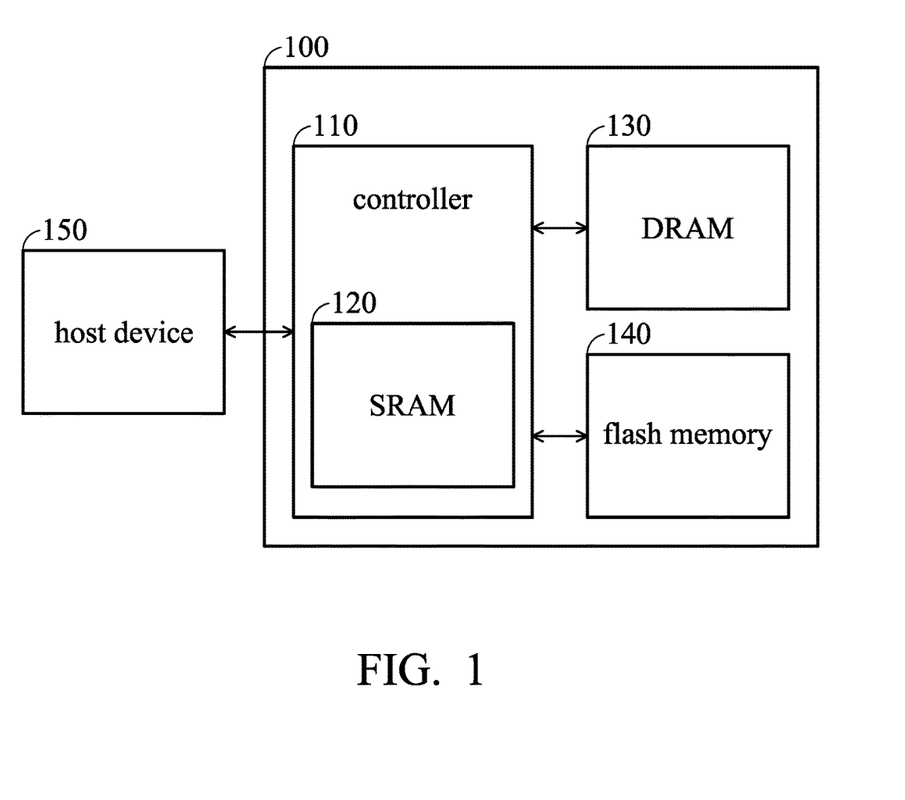
FIG. 1 is a block diagram of a memory control device 100 according to an embodiment of the invention.

FIG. 1 is a block diagram of a memory control device 100 according to an embodiment of the invention. As shown in FIG. 1, the memory control device 100 may comprise a controller 110, a static random access memory (SRAM) 120, a dynamic random access memory (DRAM) 130 and a flash memory 140. FIG. 1 presents a simplified block diagram in which only the elements relevant to the invention are shown. However, the invention should not be limited to what is shown in FIG. 1.

According to the embodiments of the invention, the static random access memory 120 may be comprised in the controller to be a cache memory. The controller 110 may perform the operations according to the commands from a host device 150. The controller 110 may control the cache and access of the data in the static random access memory 120 and dynamic random access memory 130. Furthermore, the controller 110 may control the operations of reading data from the flash memory 140 and writing data into the flash memory 140.

According to the embodiments of the invention, the flash memory 140 is a non-volatile memory, e.g. NAND flash, but the invention should not be limited thereto.

According to an embodiment of the invention, the controller 110 may receive a command from the host device 150 and perform a read operation or write operation for the flash memory 140 according to the command. When the controller 110 performs the read operation according to the command from the host device 150, the controller 110 may temporarily store the reading data, which is obtained from the flash memory 140, in the static random access memory 120, and then the controller 110 may output the reading data to the host device 150. The controller may perform the read operation repeatedly according to the command from the host device 150. When the controller 110 does not perform the read operation and start to perform the write operation according to the command from the host device 150, the controller 110 may temporarily store the writing data, which is obtained from the host device 150, in the static random access memory 120, and then the controller 110 may write the writing data into the flash memory 140. The controller may perform the write operation repeatedly according to the command from the host device 150.

According to an embodiment of the invention, when the controller 110 performs the read operation, the controller 110 may record the address which corresponds to the reading data D1 (corresponding to the read operation) when the reading data D1 is in the static random access memory 120. When the static random access memory 120 stores a plurality of reading data D1, the controller 110 may record an initial address of the reading data D1 (i.e. the address corresponding to the head of the reading data D1) and the end address of the reading data D1 (i.e. the address corresponding to the tail of the reading data D1). In a preferred embodiment of the invention, the controller 110 may adopt an initial index IH to direct to the initial address of the reading data D1, and adopt an end index IT to direct to the end address of the reading data D1. Furthermore, except for the addresses beginning from the initial address of the reading data D1 and ending at the ending address of the reading data D1, the other addresses of the static random access memory 120 may be used to store the writing data D2.

In addition, the controller 110 may also record the address which corresponds to the writing data D2 (corresponding to the write operation) when the writing data D2 is in the static random access memory 120. When the static random access memory 120 stores a plurality of writing data D2, the controller 110 may record an initial address of the writing data D2 (i.e. the address corresponding to the head of the writing data D2) and the end address of the writing data D2 (i.e. the address corresponding to the tail of the writing data D2). In a preferred embodiment of the invention, the controller 110 may adopt an initial index PH to direct to the initial address of the writing data D2, and adopt an end index PT to direct to the end address of the writing data D2. Furthermore, except for the addresses beginning from the initial address of the writing data D2 and ending at the ending address of the writing data D2, the other addresses of the static random access memory 120 may be used to store the reading data D1. According to the embodiment of the invention, the controller 110 may further record the data quantity of the reading data D1 and the writing data D2.

Figure 2:
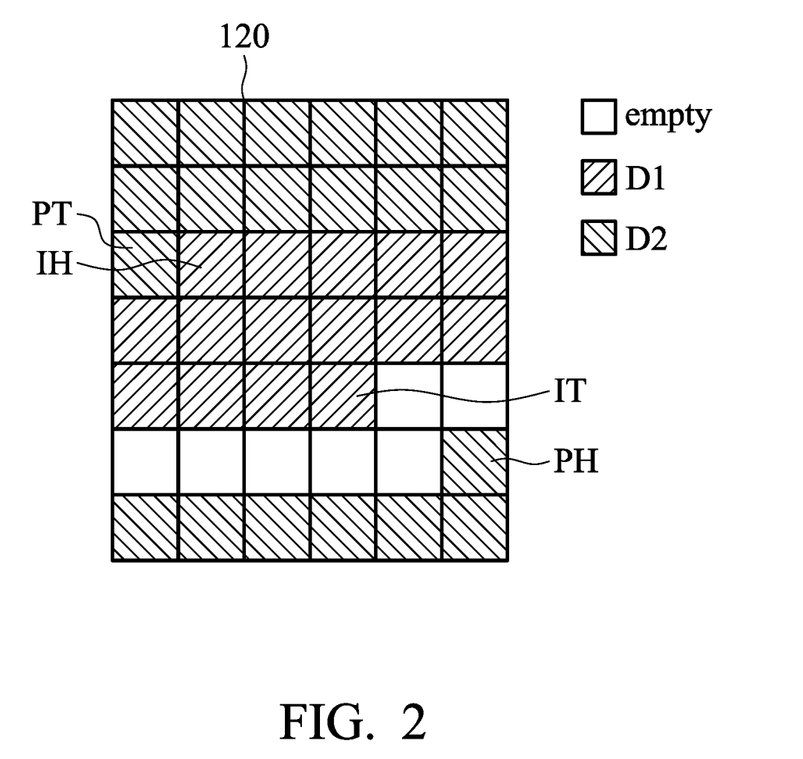
FIG. 2 is a schematic diagram illustrating a static random access memory 120 according to an embodiment of the invention.

According to an embodiment of the invention, when according to the command from the host device 150, the controller 110 knows that an read operation will need to be performed after the write operation has been completed, the controller 110 may determine whether the static random access memory 120 has enough space to temporarily store the reading data D1 according to the initial index PH and the end index PT of the writing data D2. As shown in FIG. 2, if the random access memory 120 has enough space to temporarily store the reading data D1, the controller 110 will not back up the writing data D2 to the dynamic random access memory 130 first. The controller 110 will directly perform the read operation according to the command from the host device 150 to temporarily store the reading data D1 in the static random access memory 120 and recode the initial index IH and the end index IT of the reading data D1. Namely, when the write operation has been completed and the read operation will be performed, the controller 110 will directly temporarily store the reading data D1 corresponding to the read operation in the static random access memory 120, i.e. the reading data D1 will be temporarily stored in the unused spaces of the static random access memory 120.

Figure 3:
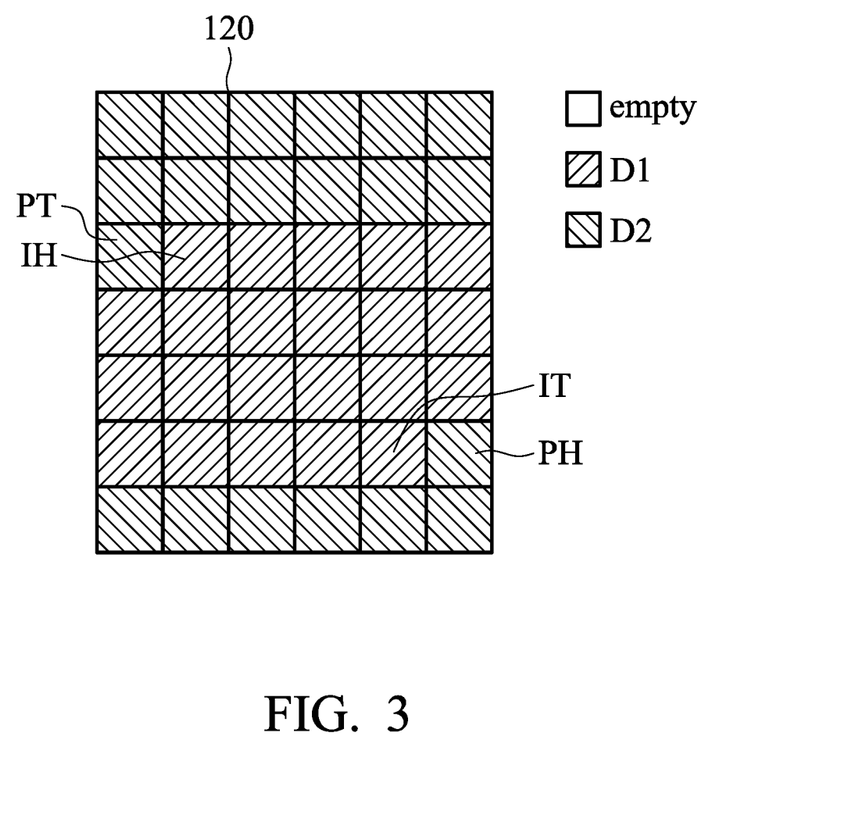
FIG. 3 is a schematic diagram illustrating a static random access memory 120 according to another embodiment of the invention.
Figure 4:
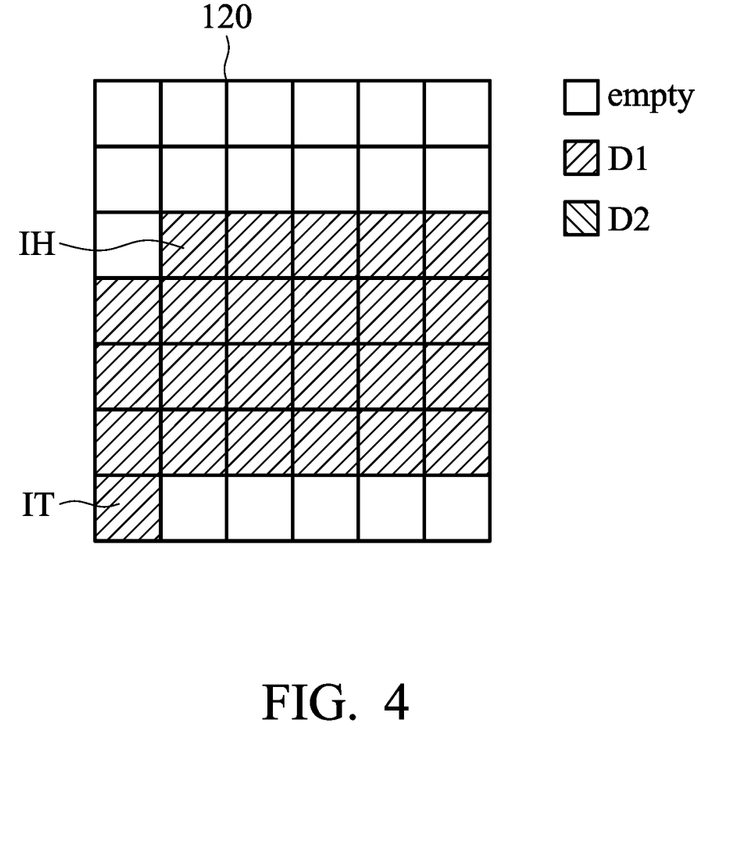
FIG. 4 is a schematic diagram illustrating a static random access memory 120 according to another embodiment of the invention.

During the controller 110 temporarily stores the reading data D1 in the static random access memory 120 sequentially, the end index IT will be directed to different addresses. Furthermore, after the reading data D1 is transmitted or outputted to the host device 150 sequentially, the reading data D1 which has been transmitted or outputted to the host device 150 will be changed to the unavailable (deletable) data, as a result, the initial index IH will also be directed to different addresses. As shown in FIG. 3, when the end index IT will be directed to the address which the initial index PH directs to, it means that the static random access memory 120 has not heaven enough space to temporarily store the reading data D1. Therefore, the controller 110 will back up all of the writing data D2 temporarily stored in the static random access memory 120 to the dynamic random access memory 130 to vacate the space in the static random access memory 120 to store the reading data D1. In other words, as shown in FIG. 4, if the static random access memory 120 has enough space to temporarily store the reading data D1, the controller 110 will not back up the writing data D2 to the dynamic random access memory 130. Therefore, the command latency will be reduced.

Note that, if the writing data D2 has been temporarily stored in the static random access memory 120, when a write operation has been completed, one part of the writing data D2 will be unavailable (or deletable) (i.e. the writing data D2 corresponding to this write operation has been written into the into the flash memory 140), but the other part of the writing data D2 still available (i.e. the writing data D2 which has not been written into the into the flash memory 140), as a result, the address which the initial index PH directs to will be changed. In a preferred embodiment of the invention, when a read operation will be performed after the write operation has been completed, the controller 110 may adopt the address next to the address that the end index PT directs to, and designate the adopted address to be the address which the initial index IH directs to. Then, the controller 110 starts to temporarily store the reading data D1 to the static random access memory 120. Finally, the controller 110 may recode the tail of the reading data D1 by the end index IT. When the reading data D1 or the writing data D2 will be changed to unavailable (or deletable), this change is related to the order and result of the command from the host device 150, therefore, the details are not discussed in the invention.

On the other hand, when according to the command from the host device 150, the controller 110 knows that a write operation will need to be performed after the read operation has been completed, the controller 110 may not back up the reading data D1 to the dynamic random access memory 130 first. The controller 110 may temporarily store the writing data D2 in the static random access memory 120, and directly perform the write operation. Because only one group of the initial index PH and end index PT is used, the initial index PH may direct to the address which is next to the address that the end index IT directs to, and the controller 110 may temporarily store the writing data D2 from the address that the initial index PH directs to. Accordingly, the range from the initial index PH to the end index PT may cover the storage spaces which have been used to temporarily store the reading data D1. Therefore, when the write operation is performed, the controller 110 may obtain the writing data D2 based on the initial index PH and the end index PT, and the controller 110 may further avoid the writing data D2 being stored in the storage spaces which have been used to temporarily store the reading data D1 based on the initial index IH and the end index IT. However, if the static random access memory 120 does not have enough space to temporarily store the writing data D2, the controller 110 may back up the reading data D1 to the dynamic random access memory 130 to vacate the space in the static random access memory 120 to store the writing data D2.

Figure 5:
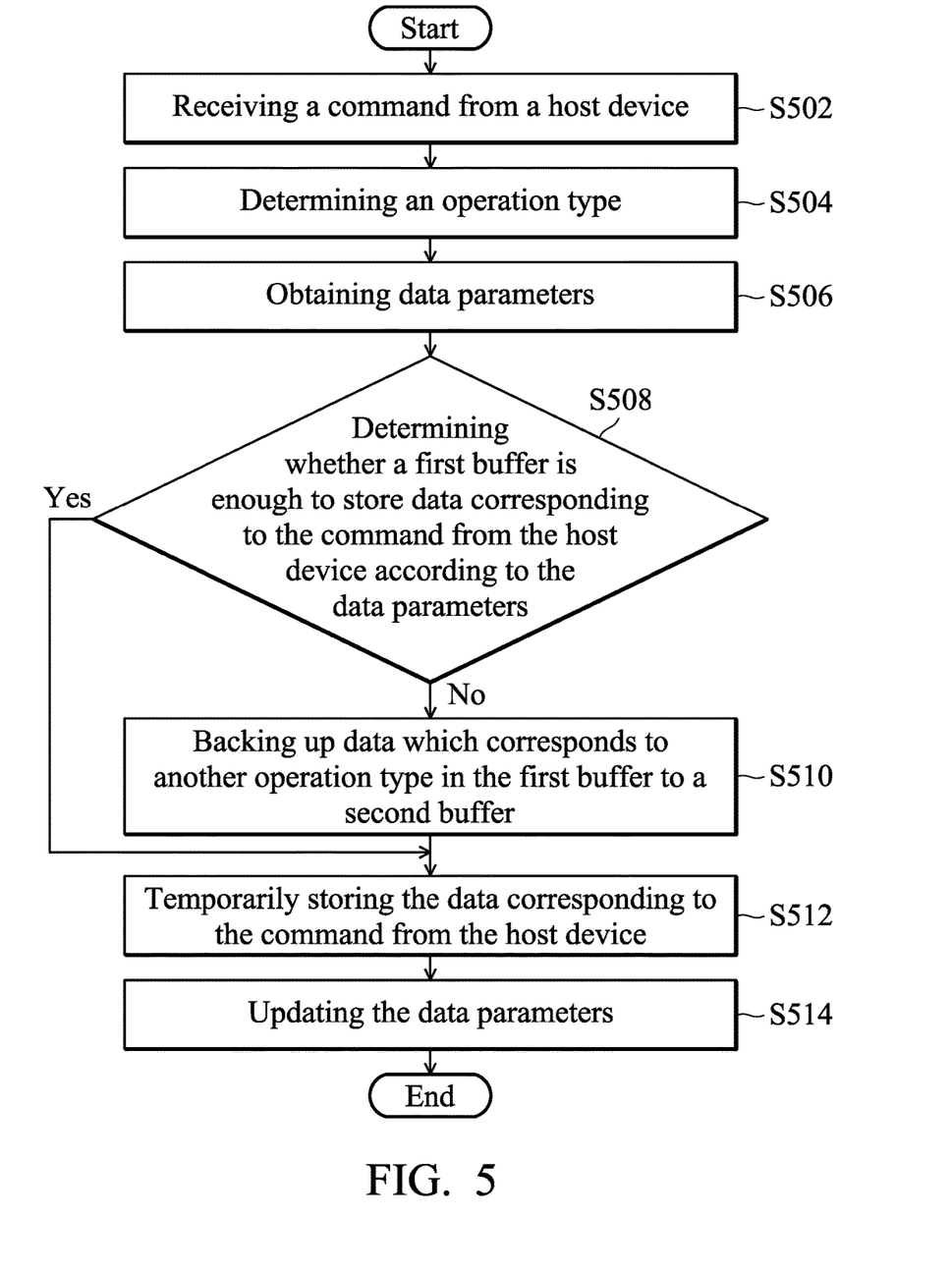
FIG. 5 is a flow chart 300 illustrating a memory controlling method according to an embodiment of the invention.

FIG. 5 is a flow chart 300 illustrating a memory controlling method according to an embodiment of the invention. The memory controlling method is applied to the memory control device 100. As shown in FIG. 5, in step S502, the memory control device 100 may receive a command from a host device.

In step S504, the memory control device 100 may determine the operation type corresponding to the command from the host device. That is to say, the controller 110 of the memory control device 100 may determine whether the command from the host device indicates a read operation or a write operation. In step S506, the controller 110 may obtain the data parameters (i.e. the initial index and the end index) corresponding to the data temporarily stored in a first buffer (e.g. the space in the static random access memory 120). The controller 110 may obtain the initial index IH and the end index IT of the reading data D1 and obtain the initial index PH and the end index PT of the writing data D2.

In step S508, the controller 110 may determine whether the first buffer (e.g. the space in the static random access memory 120) is enough to temporarily store data corresponding to the command from the host device according to the data parameters. If the controller 110 performs a read operation according to the command from the host device, the controller 110 may determine whether the first buffer is enough to temporarily store the reading data D1 according to the initial index PH and the end index PT corresponding to the writing data D2. If the controller 110 performs a write operation according to the command from the host device, the controller 110 may determine whether the first buffer is enough to temporarily store the writing data D2 according to the initial index IH and the end index IT corresponding to the reading data D1.

Back to step S508, if the first buffer is not enough to temporarily store data corresponding to the command from the host device according to the data parameters, step S510 is performed. In step S510, the controller 110 may back up the data corresponding to the operation type which is different from the operation type of the command from the host device from the first buffer to a second buffer (e.g. the space in the dynamic random access memory 130). If the data corresponding to the operation type of the command from the host device is reading data D1, when the controller 110 determines that the first buffer (e.g. the space in the static random access memory 120) is not enough to temporarily store the reading data according to the initial index PH and the end index PT, the controller 110 may back up the writing data D2 to the second buffer (e.g. the space in the dynamic random access memory 130) to make sure that the static random access memory 120 has enough space to temporarily store the reading data D1, and vice versa.

In step S512, the controller 110 temporarily stores the data corresponding to the command from the host device in the first buffer (e.g. the space in the static random access memory 120). In step S514, the controller 110 updates the data parameters according to the temporarily stored data. When the first buffer (e.g. the space in the static random access memory 120) is enough to temporarily store the reading data D1, the controller 110 may temporarily store the reading data D1 in the space in the static random access memory 120, and the controller 110 may update the values of the initial index IH and the end index IT according to the increase or decrease of the reading data D1. Accordingly, When the first buffer (e.g. the space in the static random access memory 120) is enough to temporarily store the writing data D2, the controller 110 may temporarily stores the writing data D2 in the space in the static random access memory 120, and the controller 110 may update the values of the initial index PH and the end index PT according to the increase or decrease of the writing data D2.

According to the memory controlling method provided in the embodiments of the invention, when the controller 110 performs different types of operations for the flash memory 140, the controller 110 will not need to back up the data temporarily stored in the static random access memory 120 to the dynamic random access memory 130 first. The controller 110 may directly temporarily store data corresponding to the current operation type in the static random access memory 120. The controller 110 may not back up the data corresponding to different operation type from the static random access memory 120 to the dynamic random access memory 130 until the static random access memory 120 does not have enough space to store data corresponding to the current operation type. Therefore, the memory controlling method of the invention may avoid the command latency which occurs when there are too many operations of backing up data for different operation types. Furthermore, the memory controlling method of the invention may increase the efficiency of the read operation and the write operation.

Reference throughout this specification to "one embodiment" or "an embodiment" means that a particular feature, structure, or characteristic described in connection with the embodiment is included in at least one embodiment of the invention, but do not denote that they are present in every embodiment. Thus, the appearances of the phrases "in one embodiment" or "in an embodiment" in various places throughout this specification are not necessarily referring to the same embodiment of the invention.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A memory control device, comprising:
a controller, comprising a static random access memory, receiving a command from a host device, determining an operation type indicated by the command from the host device, and obtaining data parameters corresponding to data stored in the static random access memory, wherein the static random access memory has a first buffer; and
a dynamic random access memory, coupled to the controller and having a second buffer,
wherein when the first buffer has stored data which corresponds to another operation type, the controller determines whether the first buffer is enough to store data corresponding to the command from the host device according to the data parameters, wherein when the first buffer is not enough to store data corresponding to the command from the host device, the controller backs up data which corresponds to the another operation type in the first buffer to the second buffer, wherein the another operation type is different from the operation type corresponding to the command from the host device, and the controller temporarily stores the data corresponding to the command from the host device in the first buffer, and updates the data parameters,
wherein when the first buffer is enough to store data corresponding to the command from the host device, the controller temporarily stores the data corresponding to the command from the host device in the first buffer, and updates the data parameters without backing up data which corresponds to another operation type in the first buffer to the second buffer.

2. The memory control device of claim 1, wherein the controller further records an initial index, an end index and quantity of data corresponding to different operation types.

3. The memory control device of claim 2, wherein the operation type is a write operation or a read operation.

4. The memory control device of claim 3, wherein when, according to the command from the host device, the controller knows that the read operation will be performed after the write operation has been completed, the controller determines whether the first buffer has enough space to temporarily store the reading data corresponding to the read operation according to the initial index and the end index of the writing data corresponding to the write operation.

5. The memory control device of claim 1, wherein when a storage range for the reading data covers storage space which is used to store the writing data, the controller backs up the writing data in the second buffer.

6. The memory control device of claim 3, wherein when according to the command from the host device, the controller knows that the write operation will be performed after the read operation has been completed, the controller determines whether the first buffer has enough space to temporarily store the writing data corresponding to the write operation according to the initial index and the end index of the reading data corresponding to the read operation.

7. The memory control device of claim 6, wherein when a storage range for the writing data covers storage space which is used to store the reading data, the controller backs up the reading data in the second buffer.

8. An memory controlling method, comprising:
receiving a command from a host device;
determining an operation type indicated by the command from the host device;
obtaining data parameters;
determining whether a first buffer is enough to store data corresponding to the command from the host device according to the data parameters when the first buffer has stored data which corresponds to another operation type;
when the first buffer is not enough to store data corresponding to the command from the host device, backing up data which corresponds to another operation type in the first buffer to a second buffer, wherein the another operation type is different from the operation type corresponding to the command from the host device; temporarily storing the data corresponding to the command from the host device in the first buffer; and updating the data parameters, and when the first buffer is enough to store data corresponding to the command from the host device, temporarily storing the data corresponding to the command from the host device in the first buffer, and updating the data parameters without backing up data which corresponds to another operation type in the first buffer to the second buffer.

9. The memory controlling method of claim 8, further comprising:

recording an initial index, an end index and quantity of data corresponding to different operation types.

10. The memory controlling method of claim 9, wherein the operation type is a write operation or a read operation.

11. The memory controlling method of claim 10, further comprising:

when the read operation will be performed after the write operation has been completed according to the command from the host device, determining whether the first buffer has enough space to temporarily store the reading data corresponding to the read operation according to the initial index and the end index of the writing data corresponding to the write operation.

12. The memory controlling method of claim 11, further comprising:

when a storage range for the reading data covers storage space which is used to the writing data, backing up the writing data in the second buffer.

13. The memory controlling method of claim 10, further comprising:

when according to the command from the host device knowing that the write operation will be performed after the read operation has been completed, determining whether the first buffer has enough space to temporarily store the writing data corresponding to the write operation according to the initial index and the end index of the reading data corresponding to the read operation.

14. The memory controlling method of claim 13, further comprising:

when a storage range for the writing data covers storage space which is used to the reading data, backing up the reading data in the second buffer.

* * * * *